(12) United States Patent
Saji et al.

(10) Patent No.: US 8,413,759 B2
(45) Date of Patent: Apr. 9, 2013

(54) AUTOMATIC TRANSMISSION DRIVE APPARATUS FOR VEHICLE

(75) Inventors: Koshiro Saji, Hiroshima (JP); Shinsuke Yoshiura, Hiroshima (JP); Masako Shinohara, Hiroshima (JP)

(73) Assignee: Mazda Motor Corporation (JP)

( * ) Notice: Subject to any disclaimer, the term of this patent is extended or adjusted under 35 U.S.C. 154(b) by 305 days.

(21) Appl. No.: 12/871,456

(22) Filed: Aug. 30, 2010

(65) Prior Publication Data

US 2011/0077121 A1 Mar. 31, 2011

(30) Foreign Application Priority Data

Sep. 28, 2009 (JP) .................................. 2009-222790

(51) Int. Cl.
*B60W 10/04* (2006.01)
(52) U.S. Cl. ........................ 180/374; 180/344; 180/377
(58) Field of Classification Search .................. 180/337, 180/367, 305–307, 252–253, 291–293, 301, 180/344, 346, 348, 353, 360, 364, 369, 374, 180/376–377; 477/156–157
See application file for complete search history.

(56) References Cited

U.S. PATENT DOCUMENTS

| | | | | |
|---|---|---|---|---|
| 5,158,152 A * | 10/1992 | Nemoto et al. | ............... | 184/6.12 |
| 5,474,428 A | 12/1995 | Kimura et al. | | |
| 5,976,055 A * | 11/1999 | Sasaki | ............................... | 477/64 |
| 6,253,137 B1 * | 6/2001 | Abo et al. | ........................ | 701/51 |
| 7,644,638 B2 * | 1/2010 | Taniai | ............................... | 74/335 |
| 7,762,277 B2 * | 7/2010 | Yoshida et al. | ............ | 137/565.33 |
| 2005/0230171 A1 * | 10/2005 | Hasegawa et al. | ................ | 180/242 |
| 2010/0081537 A1 * | 4/2010 | Sakaue et al. | .................. | 475/331 |
| 2010/0222974 A1 * | 9/2010 | Nakamura et al. | ............... | 701/62 |
| 2010/0250050 A1 * | 9/2010 | Ayabe | ............................. | 701/29 |
| 2011/0320097 A1 * | 12/2011 | Oshima | ............................. | 701/60 |
| 2012/0011961 A1 * | 1/2012 | Frait et al. | .................... | 74/606 R |

FOREIGN PATENT DOCUMENTS

| | | |
|---|---|---|
| JP | 2000-313253 A | 11/2000 |
| JP | 2005-098338 A | 4/2005 |

OTHER PUBLICATIONS

The Extended European Search Report dated Nov. 22, 2010; Application No. 10008020.9-2421.

* cited by examiner

*Primary Examiner* — Joseph Rocca
*Assistant Examiner* — James English
(74) *Attorney, Agent, or Firm* — Studebaker & Brackett PC; Donald R. Studebaker

(57) ABSTRACT

An oil-pressure output device (electric pump unit) is arranged on an outer wall face of an automatic transmission which is positioned on an opposite side to an engine (left side of a vehicle). An arrangement position of the oil-pressure output device is out of a movable range of one of the steered driving wheels which is located on the opposite side to the engine (left front wheel). Accordingly, a simpler layout change between a case of attaching the oil-pressure output device to the automatic transmission and another case of not attaching the one can be provided, so that commonality of components or layout of the automatic transmission and its surrounding devices and structures can be provided.

14 Claims, 10 Drawing Sheets

AUTOMATIC TRANSMISSION DRIVE APPARATUS FOR VEHICLE

BACKGROUND OF THE INVENTION

The present invention relates to an automatic transmission drive apparatus for a vehicle, comprising an oil-pressure output device, such as an electric pump unit, which is attached to an automatic transmission from outside.

Conventionally, an idling stop system which controls an engine to automatically stop when a specified stop condition of a vehicle is satisfied and to restart when a specified restart condition of the vehicle is satisfied for improvement of fuel economy and reduce of emission, is known (see Japanese Patent Laid-Open Publication No. 2000-313253, for example).

In the vehicle equipped with the idling stop system, an oil pump generally stops during an engine stop, so that an oil pressure may not be supplied to frictional engaging elements of an automatic transmission from the oil pump. Accordingly, when the vehicle stops in a state in which a gear shift range of the automatic transmission is set at a drive range, for example, a specified frictional engaging element to be engaged may be released improperly.

In contrast, there has been proposed an electric pump unit which is attached to an automatic transmission from outside in addition to the above-described oil pump driven by the engine, in which a necessary oil pressure to engage the frictional engaging element can be supplied by this electric pump unit during the engine stop (see Japanese Patent Laid-Open Publication No. 2005-098338, for example). Herein, the electric pump unit is arranged around a torque converter housing of the automatic transmission at a specified position which is at a front and lower portion of the torque converter housing. Thus, a layout change around the automatic transmission may be unnecessary between a case of installing the idling stop system (with the electric pump unit) and another case of not installing the idling stop system (without the electric pump unit).

However, in case the electric pump unit is arranged at the front portion of the torque converter housing, like the above-described conventional example, there is a problem in that a support structure would become complex in order to properly reduce an influence on a vehicle crash performance.

SUMMARY OF THE INVENTION

The present invention has been devised in view of the above-described problem, and an object of the present invention is to provide an automatic transmission drive apparatus for a vehicle which can provide a simpler layout change between a case of attaching the oil-pressure output device, such as the electric pump unit, to the automatic transmission and another case of not attaching the one, so as to promote commonality of components or layout of the automatic transmission and its surrounding devices and structures.

According to the present invention, there is provided an automatic transmission drive apparatus for a vehicle, which is disposed laterally in an engine room of a vehicle front portion such that an axis thereof extends in a vehicle width direction, comprising an engine outputting a drive force, an automatic transmission provided on one side of the engine in the vehicle width direction, a differential device, to which the drive force of the engine is transmitted via the automatic transmission, left and right drive shafts extending from the differential device in the vehicle width direction and connecting to left and right steered driving wheels, respectively, and an oil-pressure output device outputting an oil pressure, the oil-pressure output device being arranged on an outer wall face of the automatic transmission which is positioned on an opposite side to the engine, an arrangement position of the oil-pressure output device being out of a movable range of one of the steered driving wheels which is located on the opposite side to the engine.

According to the present invention, since the oil-pressure output device is arranged on the outer wall face of the automatic transmission which is positioned on the opposite side to the engine, there may be no need of considering the vehicle crash function. Accordingly, the oil-pressure output device may be simply attached to the above-described outer wall face, and two pipes and the like which have oil flow between the automatic transmission and the oil-pressure output device may be simply added for the case of not arranging the oil-pressure output device. Meanwhile, in case of the oil-pressure output device being arranged on the above-described outer wall face, it is likely that the oil-pressure output device comes into a movable range of one of the steered driving wheels which is located on the opposite side to the engine. However, the oil-pressure output device can be out of this movable range simply by positioning the oil-pressure output device arranged on the outer wall face at a location within a range of a specified distance or less in a vehicle longitudinal direction from one of the drive shafts which is located on the opposite side to the engine, for example. That is, at a specified position in the vehicle longitudinal direction which is the specified distance or less from one of the drive shafts located on the opposite side to the engine, the steered driving wheel does not move very greatly inwardly in the vehicle width direction (toward a side of the above-described outer wall face), so that a relatively large space is generated between the above-described outer wall face and an inward end of the above-described movable range. Accordingly, this space can be a layout space for the oil-pressure output device. Thus, any layout change of the automatic transmission and the surrounding devices or structures may not be necessary for the case without the oil-pressure output device, and the oil-pressure output device can be arranged properly by utilizing the space. Further, commonality of components of the automatic transmission and its surrounding devices can be properly promoted.

According to an embodiment of the present invention, the arrangement position of the oil-pressure output device is within a range of a specified distance or less in a vehicle longitudinal direction from one of the drive shafts which is located on the opposite side to the engine. Thereby, as described above, the oil-pressure output device can be positioned easily out of the movable range of one of the steered driving wheels located on the opposite side to the engine.

According to another embodiment of the present invention, wherein the differential device and one of the drive shafts which is located on the opposite side to the engine are positioned in back of the automatic transmission, and the oil-pressure output device is arranged at a rear portion of the outer wall face of the automatic transmission. Thereby, the oil-pressure output device can be positioned as closely to the drive shaft on the opposite side to the engine in the vehicle longitudinal direction as possible. That is, the oil-pressure output device arranged on the outer wall face can be positioned within the range of the specified distance or less in the vehicle longitudinal direction from the drive shaft located on the opposite side to the engine, so that the relatively large space can be generated between the above-described outer wall face and the inward end of the above-described movable range.

According to another embodiment of the present invention, the oil-pressure output device, when viewed from above, overlaps with a vehicle-body member which extends in a vehicle longitudinal direction on the opposite side to the engine. That is, in general, a vehicle-body member, such as a side frame or a sub frame, is provided so as to extend in the vehicle longitudinal direction on a side of the automatic transmission which is opposite to the engine. Herein, the above-described outer wall face is generally positioned closely to the above-described vehicle-body member in the case of not providing the oil-pressure output device. Therefore, in order that the oil-pressure output device is arranged so as not to overlap with the above-described vehicle-body member, when viewed from above (in a plan view), it may be necessary to change the layout of the automatic transmission from the case of not providing the oil-pressure output device. However, the arrangement that the oil-pressure output device overlaps with the vehicle-body member in the plan view can have the oil-pressure output device properly arranged by utilizing the space, without changing the layout of the automatic transmission from the case of not providing the oil-pressure output device. In particular, between the side frame and the sub frame is arranged a thin-plate-shaped shield member to protect mud scattered by a rotating steered drive wheel from coming into the engine room, where a dead space is generated. By arranging the oil-pressure output device in this dead space, a properly compact layout of the oil-pressure output device can be obtained.

According to another embodiment of the present invention, the oil-pressure output device extends in a vertical direction. Thereby, the oil-pressure output device can be as close to the drive shaft on the opposite side to the engine in the vehicle longitudinal direction as possible, so that the oil-pressure output device can be easily out of the movable range of the steered driving wheel on the opposite side to the engine.

According to another embodiment of the present invention, the outer wall face of the automatic transmission is an end cover of a transmission case of the automatic transmission, and the oil-pressure output device is attached to the end cover. Thereby, two pipes which have oil flow between the automatic transmission and the oil-pressure output device can be formed integrally with the end cover. Further, by attaching the oil-pressure output device to this end cover and then by attaching the end cover with the oil-pressure output device to the transmission case, attachment work of both the oil-pressure output device and the above-described pipes can be done at one time and easily. In case of not providing the oil-pressure output device, a different end cover may be attached to the transmission case. That is, a hole which is formed at the transmission case and connects to the above-described pipes may be covered with this different end cover. Accordingly, only little (easier) change may be necessary for the case of providing the oil-pressure output device.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
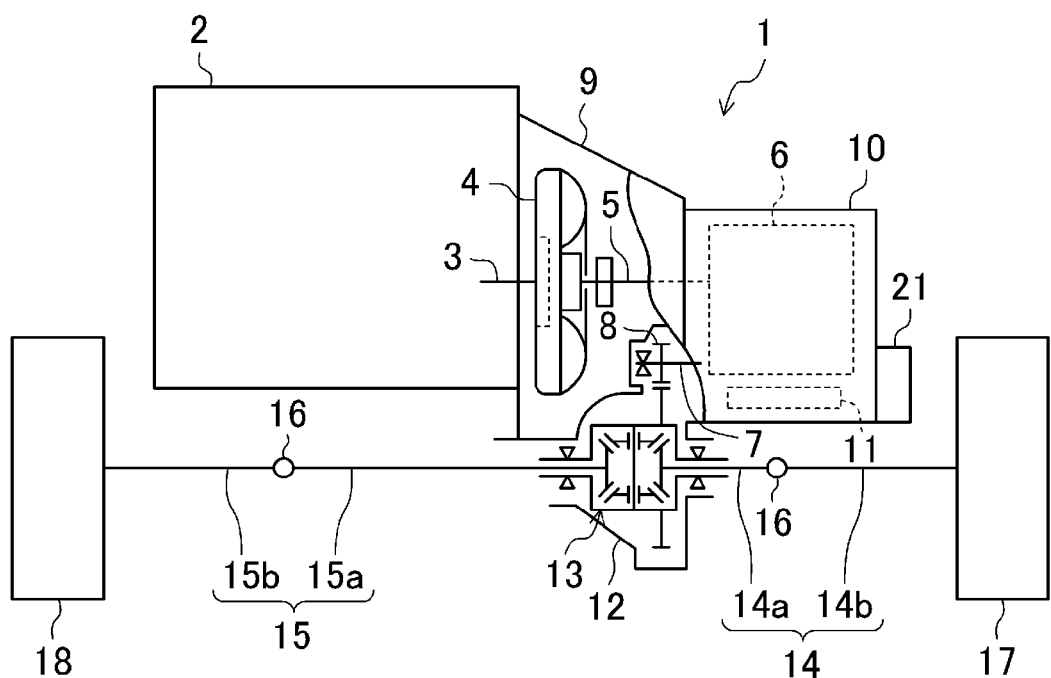
FIG. 1 is a schematic front view of an automatic transmission drive apparatus for a vehicle according to an embodiment of the present invention.

FIG. 1 is a schematic front view of an automatic transmission drive apparatus for a vehicle according to an embodiment of the present invention, which comprises an automatic transmission 1. The automatic transmission 1 is installed in a vehicle, which comprises an engine 2 which is disposed laterally in an engine room of a vehicle front portion such that its axis extends in a vehicle width direction. The automatic transmission 1 is arranged on one side of the engine 2 (a left side of the vehicle (on the right in FIG. 1) in the present embodiment). A crankshaft 3 of the engine 2 extends in the vehicle width direction, and a pump impeller (not illustrated) of a torque converter 4 of the automatic transmission 1 is connected to the crankshaft 3. The torque converter 4 comprises a turbine which faces to the pump impeller, and an automatic transmission mechanism portion 6 of the automatic transmission 1 is connected to a turbine shaft 5 of a rotational shaft of the turbine. Thus, an output of the crankshaft 3 is transmitted to the automatic transmission mechanism portion 6 via the torque converter 4. The automatic transmission mechanism portion 6 comprises plural frictional engaging elements (clutches) to enable a multi-stage speed gear shift. An output shaft 7 of the automatic transmission mechanism portion 6 also extends in the vehicle width direction, and an output gear 8 is fixed to the output shaft 7. Hereinafter, the front, rear, left and right of the vehicle will be simply referred to as "front" "rear" "left" and "right."

The torque converter 4 is stored in the torque converter housing 9 which is fixed to a left side face of the engine 2. The automatic transmission mechanism portion 6 and an oil-pressure control portion 11 which controls an oil pressure to engage the frictional engaging elements of the automatic transmission mechanism portion 6 or release their engagement are stored in a transmission case 10 which is connected to the torque converter housing 9. A lower end portion of the transmission case 10 constitutes an oil pan 10a to contain oil therein (see FIG. 2).

A differential device 13, to which a rotation from the above-described output gear 8 is transmitted, is arranged on a rear side of the automatic transmission 1. This differential device 13 is stored in a differential-device storage case 12 which is integrally formed with a rear side of the transmission case 10. Herein, while the differential device 13 (the differential-device storage case 12) and left and right front-wheel drive shafts 14, 15, which will be described below, are illustrated for convenience at a position below the automatic transmission 1 in FIG. 1, these are actually positioned behind the automatic transmission 1 (see FIGS. 2, 5, 7 and others).

To the above-described differential device 13 are connected the left and right front-wheel drive shafts 14, 15. A left front wheel 17 is connected to a tip (left end) of the left front-wheel drive shaft 14, and a right front wheel 18 is connected to a tip (right end) of the right front-wheel drive shaft 15. These front wheels 17, 18 are steered driving wheels, positions of which are changed by a steering mechanism, not illustrated. The left front-wheel drive shaft 14 comprises a pair of inside portion 14a and outside portion 14b which are coupled via a joint 16. Likewise, the right front-wheel drive shaft 15 comprises a pair of inside portion 15a and outside portion 15b which are coupled via another joint 16.

Figure 2:
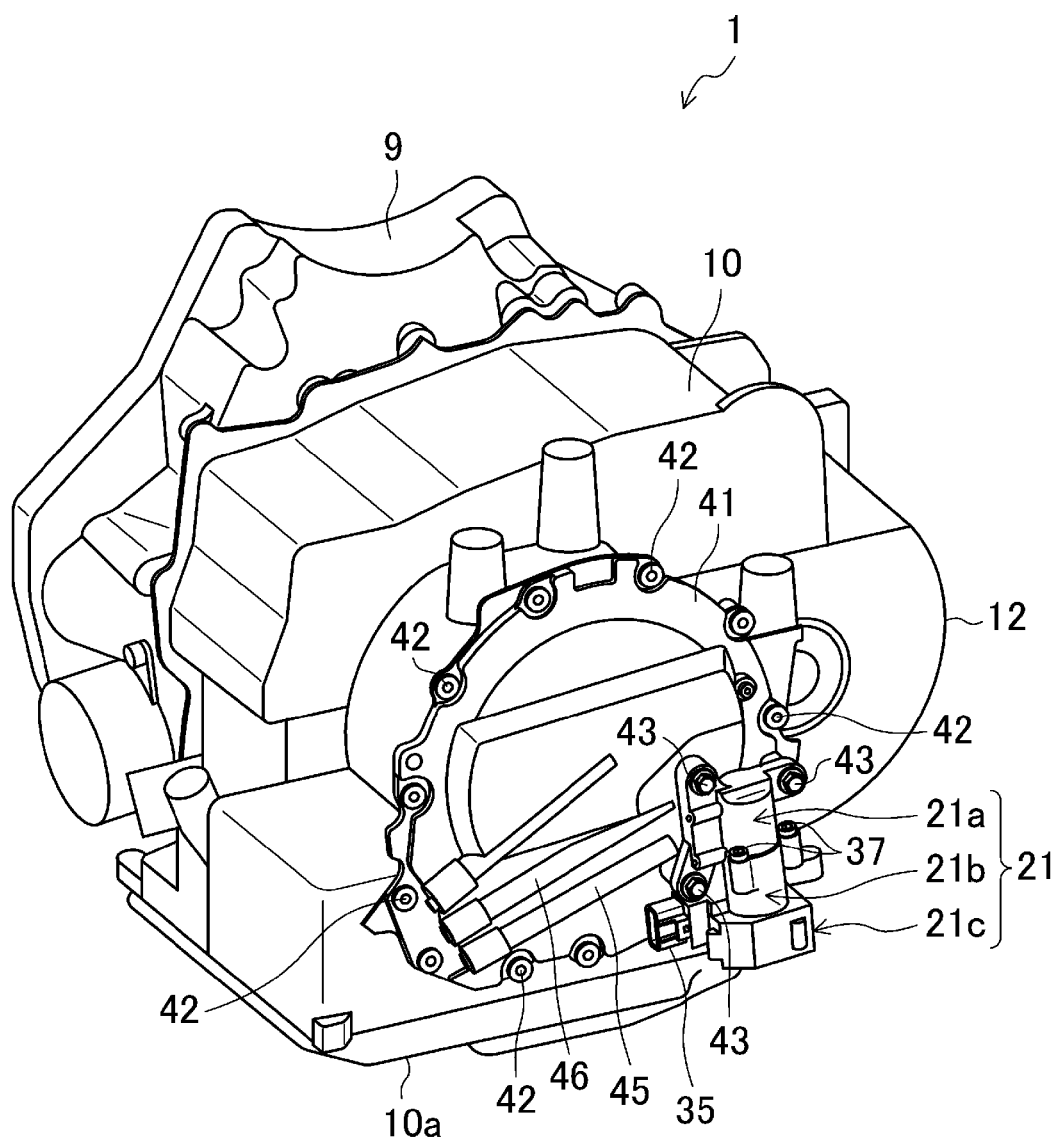
FIG. 2 is a perspective view of an automatic transmission and an electric pump unit of the automatic transmission drive apparatus for a vehicle, when viewed obliquely from the front and left of the vehicle.
Figure 3:
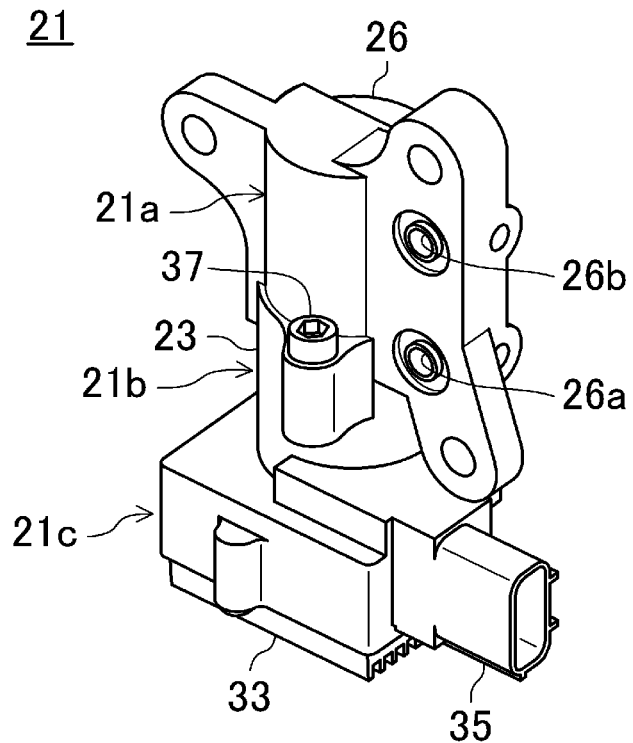
FIG. 3 is a perspective view of the electric pump unit attached to the automatic transmission.
Figure 4:
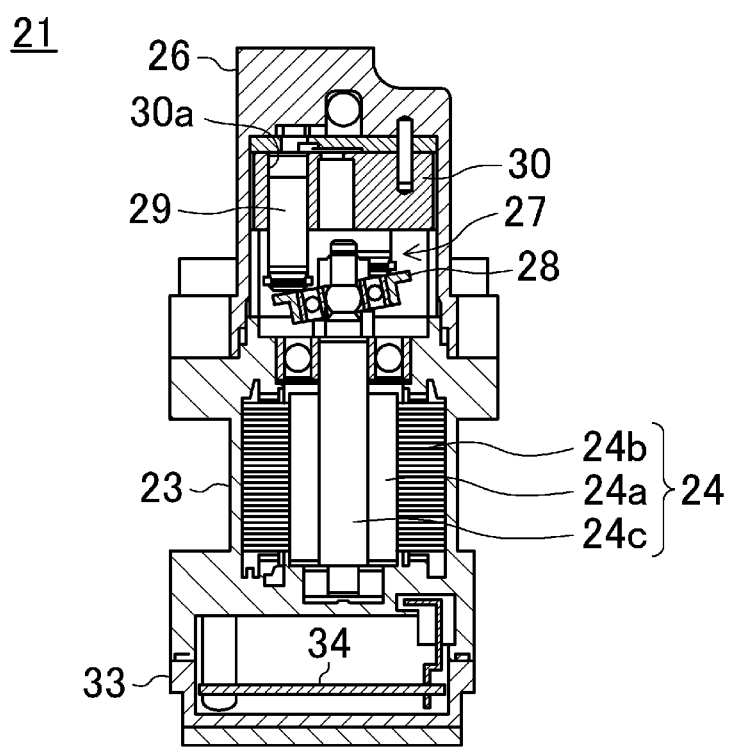
FIG. 4 is a vertical sectional view of the electric pump unit.

FIG. 2 is a perspective view of the automatic transmission 1, when viewed obliquely from the front and left. As shown in this figure, an electric pump unit 21 is arranged on an outer wall face of the automatic transmission 1 which is positioned on an opposite side to the engine 2. This electric pump unit 21 is a well-known axial piston type of pump unit as shown in FIGS. 3 and 4, which comprises a pump portion 21a, a motor portion 21b, and a driver circuit portion 21c. The electric pump unit 21 is arranged on the above-described outer wall face so as to extend in a vertical direction. The pump portion 21a, the motor portion 21b, and the driver circuit portion 21c are disposed in order from the top.

The motor portion 21b comprises a medium case 23 which is positioned between an upper case 26 and a lower case 33, which will be described below, and an electric motor 24 which is arranged in the medium case 23 and includes a rotor 24a and a stator 24b. A drive shaft 24c is fixed to a center of the rotor 24a, and the drive shaft 24c extends toward the pump portion 21a (upward).

The pump portion 21a comprises the upper case 26 and a pump 27 which is arranged in this upper case 26. The pump 27 comprises a slant plate 28 which is connected to the above-described drive shaft 24c, plural pistons 29 which are disposed in the upper case 26 so as to be positioned along a circumferential direction of the slant plate 28, and a cylinder block 30 which is fixed inside the upper case 26 and has cylinders 30a to accommodate the plural pistons. The slant plate 28 is rotated by the electric motor 24, so that each piston 29 reciprocates inside the cylinder 30a in its axial direction (in the vertical direction) in order. Thereby, the oil which has been sucked into the cylinders 30a through an intake port 26a which is formed at a lower portion of the upper case 26 is pushed upward inside the cylinders 30a, and is discharged out of a discharge port 26b which is formed at an upper portion of the upper case 26. Herein, the upper case 26 and the medium case 23 are fixed to each other via plural bolts 37 which are arranged in a circumferential direction.

The driver circuit portion 21c comprises the medium case 23 and the lower case 33, and a driver circuit 34 (which is formed on a base board) to drive the electric motor 24 is disposed between them. Further, a connector portion 35, to which a wire harness to supply an electric power to the driver circuit 34 is connected, is formed at a lower portion of the medium case 23.

The electric pump unit 21 performs a role of an auxiliary pump to assist an oil pump 71 (shown in FIG. 8 only) to be driven by the rotation of the engine 2. That is, the above-described vehicle is equipped with the idling stop system, which controls the engine 2 to automatically stop when a specified stop condition of the vehicle is satisfied (when the vehicle stops by pressing a brake pedal with a drive range in the automatic transmission 1, for example) and to restart when a specified restart condition of the vehicle is satisfied (when the pressing of the brake pedal is released). An operation of the oil pump 71 stops according to the automatic stop of the engine 2, so that the oil pressure may not be supplied to all of the frictional engaging elements in the automatic transmission mechanism portion 6 of the automatic transmission 1 from the oil pump 71. Accordingly, the oil pressure may not be supplied to a specified frictional engaging element which has to maintain its engagement state (a clutch which has to maintain its engagement state at a forward first-speed gear) during the automatic stop of the engine 2. Therefore, by operating the electric pump unit 21 (pump 27) with the supply of the electric power to the electric pump unit 21 (driver circuit 34) during the automatic stop of the engine 2, a situation where the oil pressure is supplied to the specified frictional engaging element which has to maintain its engagement state is properly kept. A switching operation of the oil pump 71 and the electric pump unit 21 will be described later.

The above-described outer wall face of the automatic transmission 1 on the opposite side to the engine 2 is comprised of an end cover 41 which is fixed to one face (left face) of the transmission case 10 of the automatic transmission 1 via plural connecting members 42. The electric pump unit 21 is fixed to this end cover 41 via three bolts 43 so as to extend in a vertical direction. Thus, a pump axis (an axis of the pump 27 and the electric motor 24 (drive axis)) extends in the vertical direction.

An intake pipe 45 and a discharge pipe 46 are integrally formed with the above-described end cover 41. One end of the intake pipe 45 is connected to an oil outlet (not illustrated) which is formed at a left face of the transmission case 10. The other end of the intake pipe 45 is connected to an intake port 26a which is formed at the upper case 26 of the electric pump unit 21 in a state in which the electric pump unit 21 is attached to the end cover 41. Further, one end of the discharge pipe 46 is connected to an oil inlet (not illustrated) which is formed at the left face of the transmission case 10 at a position near the above-described oil outlet. The other end of the discharge pipe 46 is connected to an discharge port 26b which is formed at the upper case 26 of the electric pump unit 21 in a state in which the electric pump unit 21 is attached to the end cover 41. Herein, seal members (O rings, for example) are respectively arranged between the other end of the intake pipe 45 and the intake port 26a and between the other end of the discharge pipe 46 and the discharge port 26b.

Herein, the electric pump unit 21 is unnecessary for a vehicle which is not equipped with the idling stop system. Accordingly, another end cover different from the above-described end cover 41 is attached to the left face of the transmission case 10 in the vehicle without the idling stop system. This different end cover does not have a structure for attachment of the electric pump unit 21, and it does not comprise the above-described intake pipe 45 and discharge pipe 46, either. The different end cover performs a role of shutting off the above-described oil inlet and oil outlet which are formed at the left face of the transmission case 10. That is, the components of the automatic transmission 1 and its surrounding devices are basically common to the vehicle with the idling stop system and the vehicle without the idling stop system except for the end cover, so that availability to the vehicle without the idling stop system can be achieved only by replacing the end cover 41 with the different end cover.

Further, layouts of the automatic transmission 1 and its surrounding devices are common to the vehicle with the idling stop system and the vehicle without the idling stop system.

Figure 5:
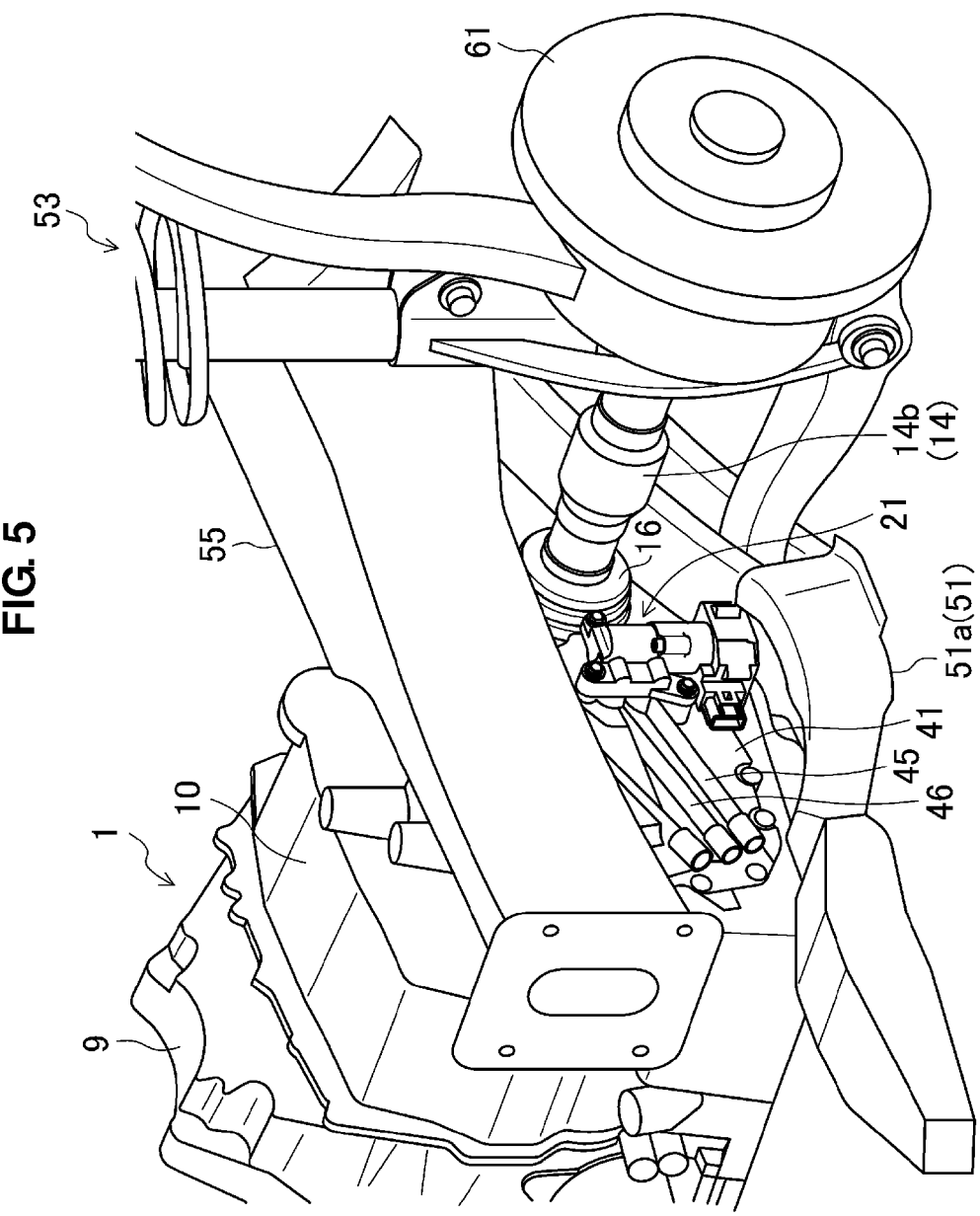
FIG. 5 is a perspective view of the automatic transmission and its surrounding vehicle-body member, when viewed obliquely from the front and left of the vehicle.

FIG. 5 shows vehicle-body members as well as the automatic transmission 1. A sub frame 51 is arranged at a lower portion of the engine room of the vehicle. The sub frame 51 comprises a front portion, a rear portion, a left side portion 51a, and a right side portion. The front portion and the rear portion extend respectively in the vehicle width direction, which are away from each other in the vehicle longitudinal direction. The left side portion 51a extends in the vehicle longitudinal direction so as to interconnect both left ends of the front portion and the rear portion, and the right side portion extends in the vehicle longitudinal direction so as to interconnect both right ends of the front portion and the rear portion. This sub frame 51 is of a rectangular frame shape (only the left side portion 51a is illustrated in FIG. 5). The sub frame 51 supports a suspension device 53 for the left front wheel 17 at a rear portion of the left side portion 51a thereof. Likewise, the sub frame 51 supports a suspension device (not illustrated) for the right front wheel 18 at a rear portion of the right side portion thereof.

Above the left side portion 51a of the sub frame 51 extends a left side frame 55 in the vehicle longitudinal direction. Likewise, above the right side portion of the sub frame 51 extends a right side frame (not illustrated) in the vehicle longitudinal direction. Crush cans (not illustrated) are fixed onto both front end faces (flanges) of the left side frame 55 and the right side frame. The left side frame 55 and the left side portion 51a of the sub frame 51 constitute a vehicle-body member which extends in the vehicle longitudinal direction on one side (left side) of the automatic transmission 1 which is opposite to the engine 2.

Figure 6:
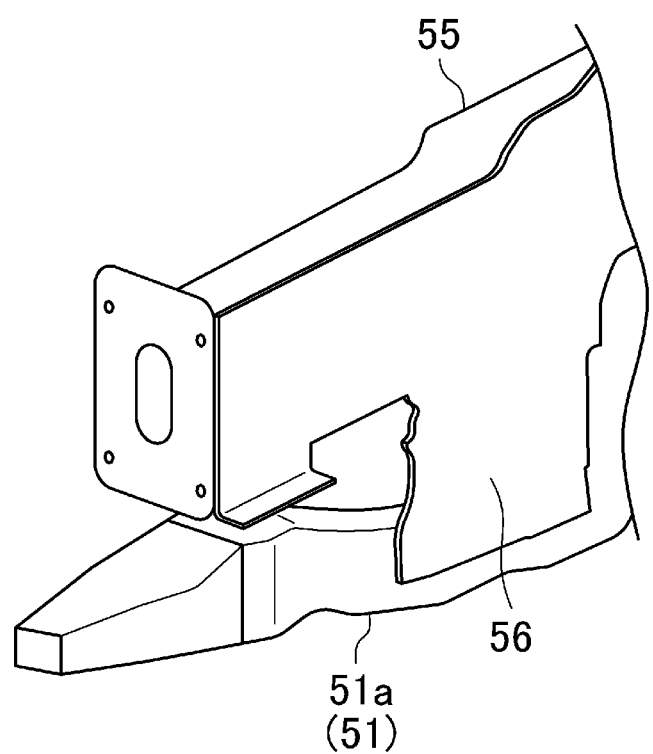
FIG. 6 is a perspective view of a left-side shield member which is arranged between a left side frame and a left side portion of a sub frame.

A thin-plate-shaped left shield member 56 is fixed to a left side face of the left side frame 55 as shown in FIG. 6 (not illustrated in FIG. 5), and this left shield member 56 extends from the left side frame 55 to the left side portion 51a of the sub frame 51 so as to be fixed to the left side face of the left side portion 51a. Thus, a gap between the left side frame 55 and the left side portion 51a of the sub frame 51 is covered with the left shield member 56, so that mud scattered by the left front wheel 17 can be prevented from coming into the engine room. Likewise, a gap between the right side frame and the right side portion of the sub frame 51 is covered with a right shield member similar to the left shield member 56.

A tip of the left front-wheel drive shaft 14 is connected to the left front wheel 17 via a hub 61 (see FIG. 5) (likewise for the right front wheel). A movable range of the left front wheel 17 is shown by hutching in FIG. 7.

Figure 7:
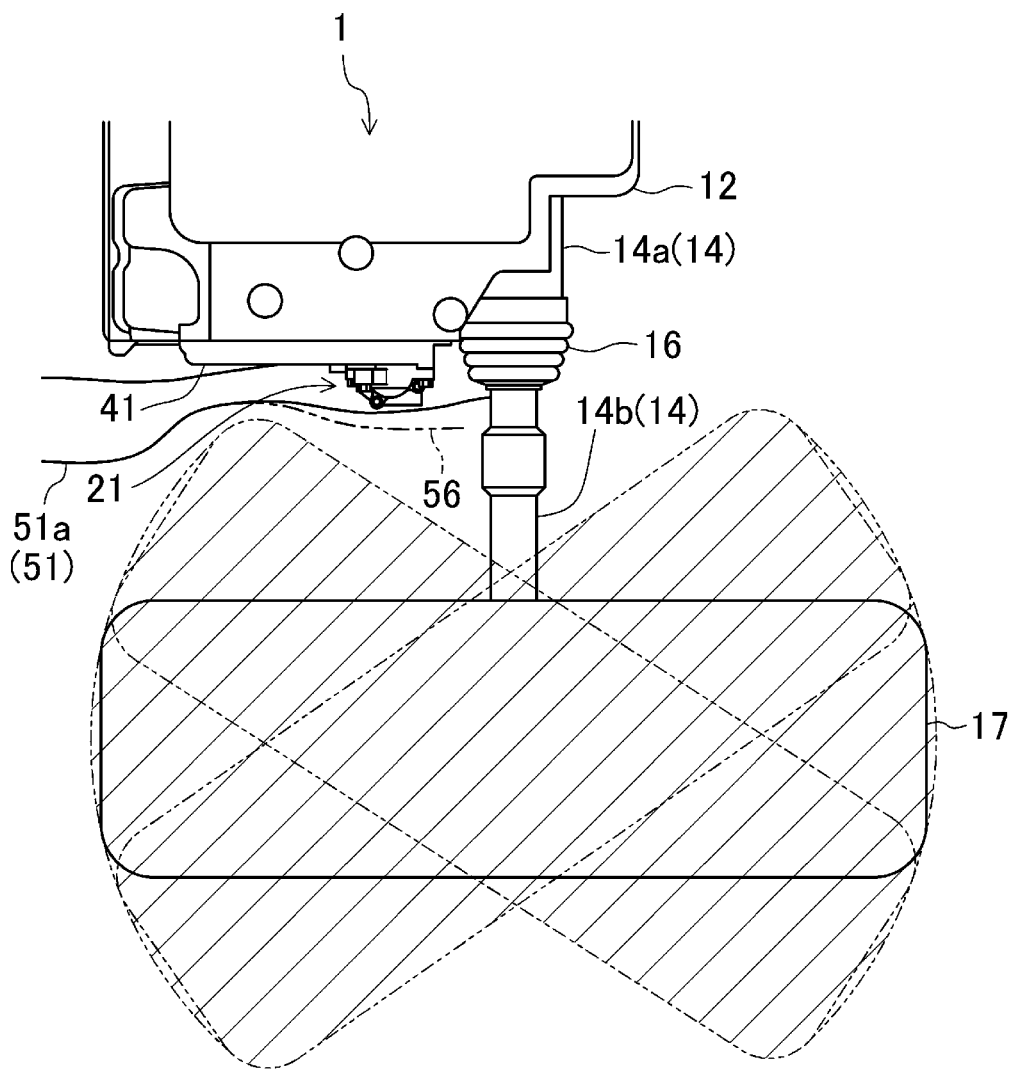
FIG. 7 is a plan view showing a positional relationship between the electric pump unit and a movable range of a left-side steered front wheel.

As shown in FIG. 7, the electric pump unit 21 is arranged at the outer face of the automatic transmission 1 on the opposite side to the engine 2 (on the left side) at a position which is out of the movable range of the left front wheel 17. Specifically, the electric pump unit 21 is arranged at the left-side outer face of the automatic transmission 1. Herein, its arrangement position is within a range of a specified distance or less in the vehicle longitudinal direction from the left front-wheel drive shaft 14 (the inside portion 14a). That is, at a specified position in the vehicle longitudinal direction which is the specified distance or less from the left front-wheel drive shaft 14 (the inside portion 14a), the left front wheel 17 does not move very greatly inwardly in the vehicle width direction (toward a side of the above-described outer wall face), so that a relatively large space is generated between the above-described outer wall face and an inward end of the above-described movable range. Accordingly, this space can be a layout space for the electric pump unit 21. Thus, in case the differential device 13 and the left front-wheel drive shaft 14 are positioned on the rear side of the automatic transmission 1 like the present embodiment, it is preferable that the electric pump unit 21 be arranged at a specified position of the outer wall face which is in front of and near the left front-wheel drive shaft 14, i.e., at a rear portion of the outer wall face (especially, at or near a rear end of the outer wall face). According to the present embodiment, the electric pump unit 21 is arranged at the outer wall face so as to extend in the vertical direction. Thereby, the electric pump unit 21 can be as close to the left front-wheel drive shaft 14 in the longitudinal direction as possible, so that the electric pump unit 21 can be easily out of the movable range of the left front wheel 17. Herein, in case the differential device 13 and the left front-wheel drive shaft 14 are positioned on the front side of the automatic transmission 1, it is preferable that the electric pump unit 21 be arranged at a front portion of the outer wall face (especially, at or near a front end of the outer wall face).

The electric pump unit 21 is positioned between the left side frame 55 and the left side portion 51a of the sub frame 51. That is, the electric pump unit 21, when viewed from above (i.e., in a plan view), overlaps with the left side frame 55 and the left side portion 51a of the sub frame 51 which extend in the vehicle longitudinal direction on the opposite side to the engine 2 (on the left side). Accordingly, the electric pump unit 21 is attached to the lower portion of the outer wall face. Herein, while the electric pump unit 21 is positioned on an inward side of the left shield member 56 in the present embodiment, a hole may be formed at a specified portion of the left shield member 56 which corresponds to the electric pump unit 21, and the electric pump unit 21 may be arranged so as to project outwardly through this hole to a certain extent, not reaching the above-described movable range of the left front wheel 17.

Figure 8A:
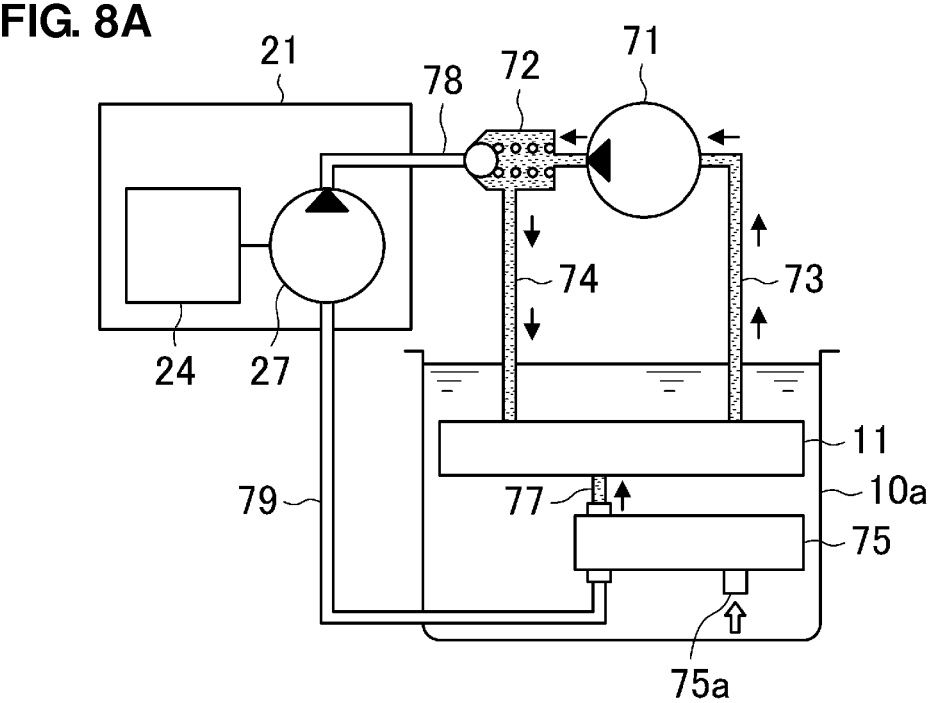
FIG. 8A is a schematic diagram showing a state in which an oil pump operates.
Figure 8B:
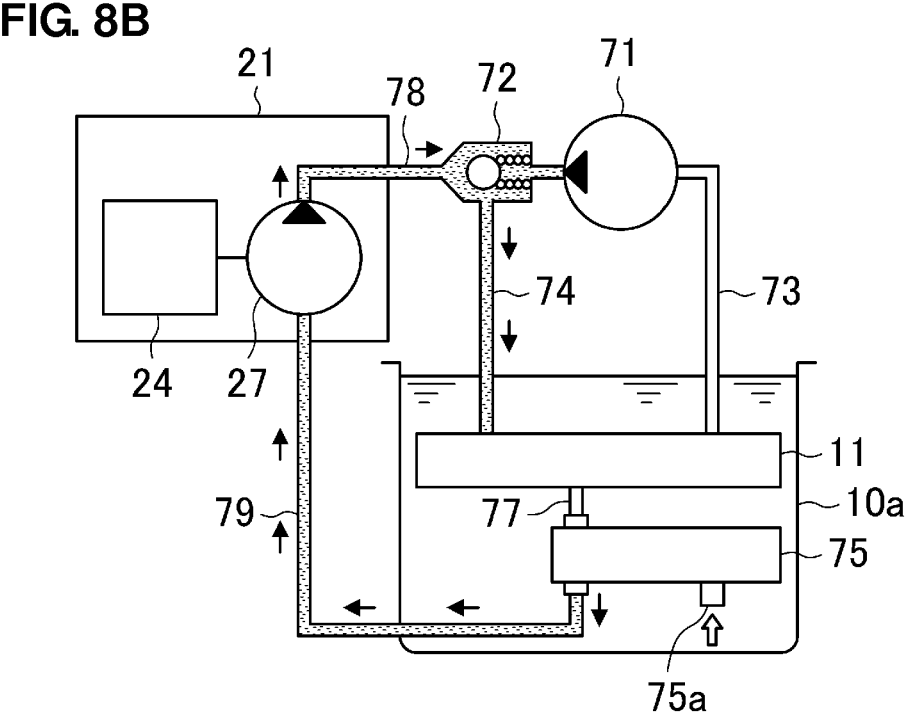
FIG. 8B is a schematic diagram showing another state in which the electric pump unit operates.

FIG. 8A is a schematic diagram showing a state in which the oil pump 71 operates, and FIG. 8B is a schematic diagram showing another state in which the electric pump unit 21 operates.

During the operation of the engine 2, the oil pump 71 is driven by the rotation of the engine 2, and the electric pump unit 21 (pump 27) does not operate (the electric power is not supplied to the driver circuit 34). The drive of the oil pump 71 sucks the oil stored in the oil pan 10a via a suction port 75a of an oil strainer 75 which is arranged in the oil pan 10a. The sucked oil flows though an oil passage 73 between the oil strainer 75 and the oil-pressure control portion 11, the oil-pressure control portion 11, and an oil passage 73 between the oil-pressure control portion 11 and the oil pump 71, and then comes into the oil pump 71. The oil discharged from the oil pump 71 is supplied to the oil-pressure control portion 11 through an oil passage 74 between the oil-pressure control portion 11 and the oil pump 71. The oil-pressure control portion 11 controls the engagement of the frictional engaging elements in the automatic transmission mechanism portion 6 and the release of their engagement.

To a medium portion of the above-described oil passage 74 is connected one end of an oil passage for discharge 78 via a check valve 72. Part of the oil passage for discharge 78 (on the side of the other end of this oil passage 78) is comprised of the above-described discharge pipe 46, and the other end of the oil passage for discharge 78 is connected to the discharge port 26b of the electric pump unit 21. The check valve 72 restrains the oil discharged from the oil pump 71 from flowing to the electric pump unit 21, so that the oil from the oil pump 71 flows into the oil-pressure control portion 11.

Meanwhile, when the engine 2 stops automatically, the operation of the oil pump 71 stops, and therefore the electric power is supplied to the driver circuit 34 of the electric pump unit 21 to drive the electric motor 24 and thereby operate the pump 27. Herein, the oil strainer 75 and the electric pump unit 21 are connected to each other via an oil passage for intake 79. One end of the oil passage for intake 79 is connected to the oil strainer 75, and the other end of the oil passage for intake 79 is connected to the intake port 26a of the electric pump unit 21. Part of the oil passage for intake 79 is comprised of the above-described intake pipe 45.

According to the operation of the electric pump unit 21 (pump 27), the oil in the oil pan 10a is sucked from the suction port 75a of the oil strainer 75, and then sucked into the pump 27 via the oil passage for intake 79. The oil discharged from this pump 27 (discharge port 26b) is supplied to the oil-pressure control portion 11 by way of the oil passage for discharge 78, the check valve 72 and the oil passage 74. The oil-pressure control portion 11 controls the engagement of the frictional engaging elements of the automatic transmission mechanism portion 6 and the release of their engagements.

Herein, when the vehicle stops in a state in which the shift range of the vehicle in the automatic transmission 1 is the forward drive range, the engagement of the specified frictional engaging element which has to maintain its engagement state (the clutch which has to maintain its engagement state at the forward first-speed gear) is released. When the engine 2 restarts in this release state of the frictional engaging elements, the oil pump 71 is driven and thereby the oil pressure increases. Herein, the increase of the oil pressure is not properly prompt, so that there is a problem in that some delay in the engagement of the frictional engaging elements and a shock due to this delay would occur.

According to the present embodiment, the engagement state of the frictional engaging elements is maintained by operating the electric pump unit 21 during the automatic stop of the engine 2. The electric pump unit 21 starts to operate before the timing of the stop of the engine 2, and stops to operate in a specified period of time after the restart of the engine 2. Herein, the specified period of time is set at a time period to stabilize the operation of the oil pump 71. Thus, the engagement state of the frictional engaging elements can be maintained continuously, thereby preventing the above-described problem properly.

According to the present embodiment, since the electric pump unit 21 is arranged on the outer wall face of the automatic transmission 1 which is positioned on the opposite side to the engine 2 at the specified position which is out of the movable range of the left front wheel 17, there may be no need of considering the vehicle crash function, unlike the case in which the pump unit 21 is positioned on the front side of the automatic transmission 1. Accordingly, the attaching structure of the electric pump unit 21 can be simply. Further, availability to the vehicle without the idling stop system can be achieved only by changing the end cover 41. Moreover, since the arrangement position of the electric pump unit 21 is within the range of the specified distance or less in the vehicle longitudinal direction from the left front drive shaft 14, the electric pump unit 21 can be positioned easily out of the movable range of the left front wheel 17 by utilizing the space. Thus, commonality of layouts and components of the automatic transmission 1 and its surrounding devices and structures (vehicle-body member, especially) can be promoted.

Figure 9:
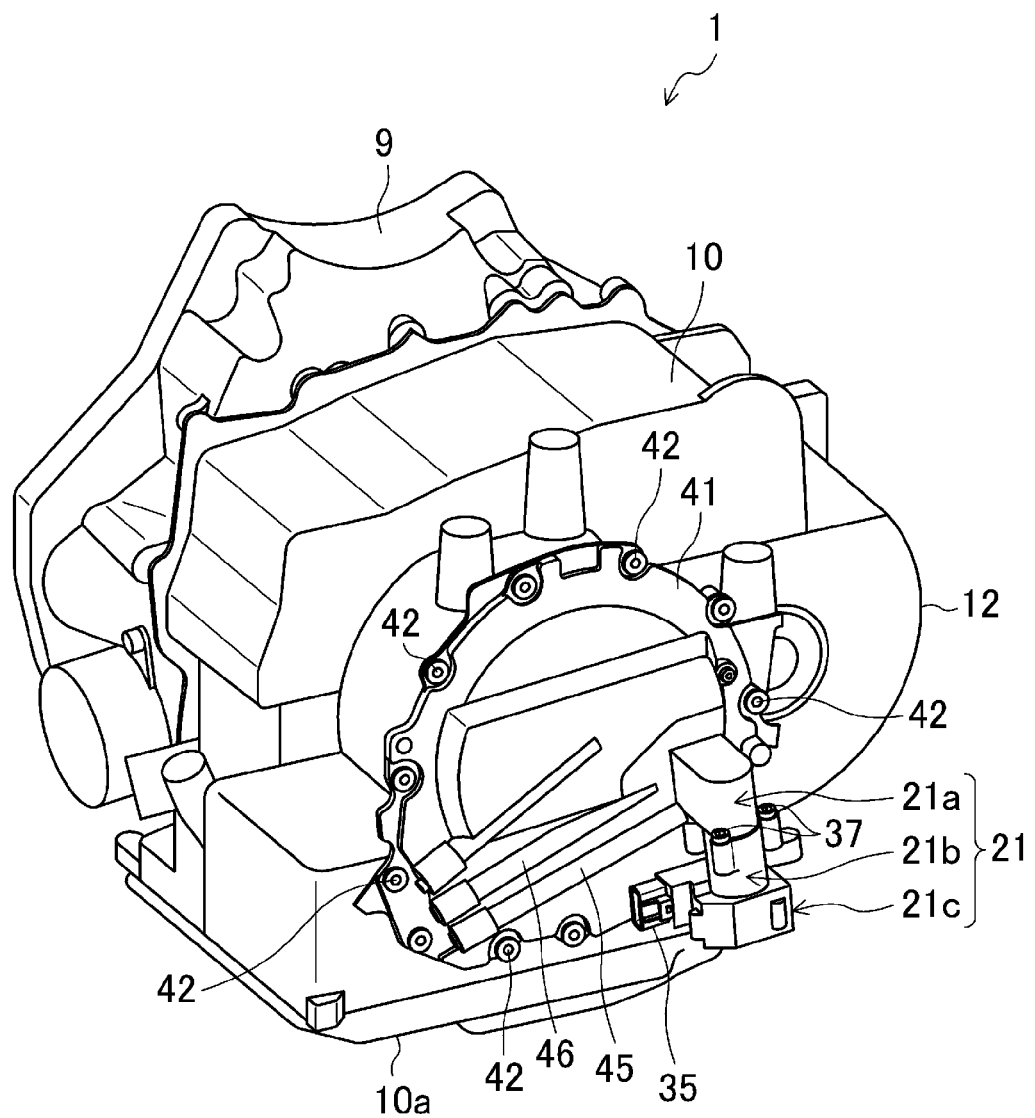
FIG. 9 is a perspective view of a modification of the electric pump unit, which corresponds to FIG. 2.
Figure 10:
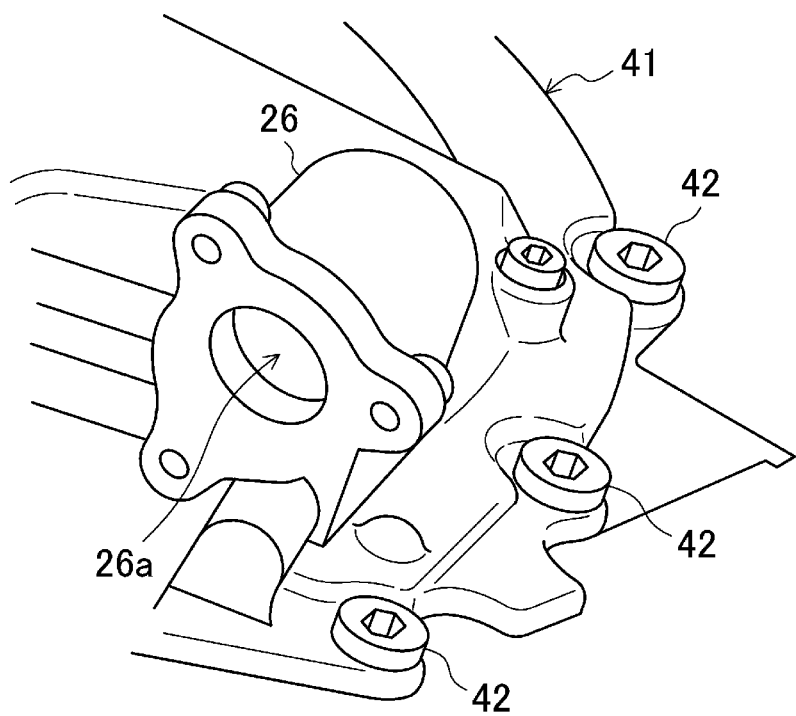
FIG. 10 is a perspective view of a major part of an end cover member with which an upper case of a pump portion of the electric pump unit shown in FIG. 9 is integrally formed.

While the entire of the electric pump unit 21 which comprises the pump portion 21a, the motor portion 21b and the driver circuit portion 21c is attached to the end cover 41 in the above-described embodiment, the electric pump unit 21 may be configured such that the motor portion 21b and the driver circuit portion 21c are attached to the pump portion 21a which has been in advance arranged to the end cover 41 as shown in FIG. 9. In this case, as shown in FIG. 10, the upper case 26 of the pump portion 21a of the electric pump unit 21 is integrally formed with the end cover 41 as shown in FIG. 10. A hollow 26a which opens downward is formed at the upper case 26, and components of the pump portion 21a have been assembled into the hollow 26a. Meanwhile, components of the motor portion 21b and the driver circuit portion 21c have been assembled into the medium case 23 and the lower case 33 which are formed integrally with each other, respectively. The medium case 23 integrally formed with the lower case 33 is fixed to the upper case 26 via the bolts 37. Herein, the bolts 43 to fix of the entire of the electric pump unit 21 to the end cover 41 which is used in the above-described embodiment are unnecessary.

Figure 11:
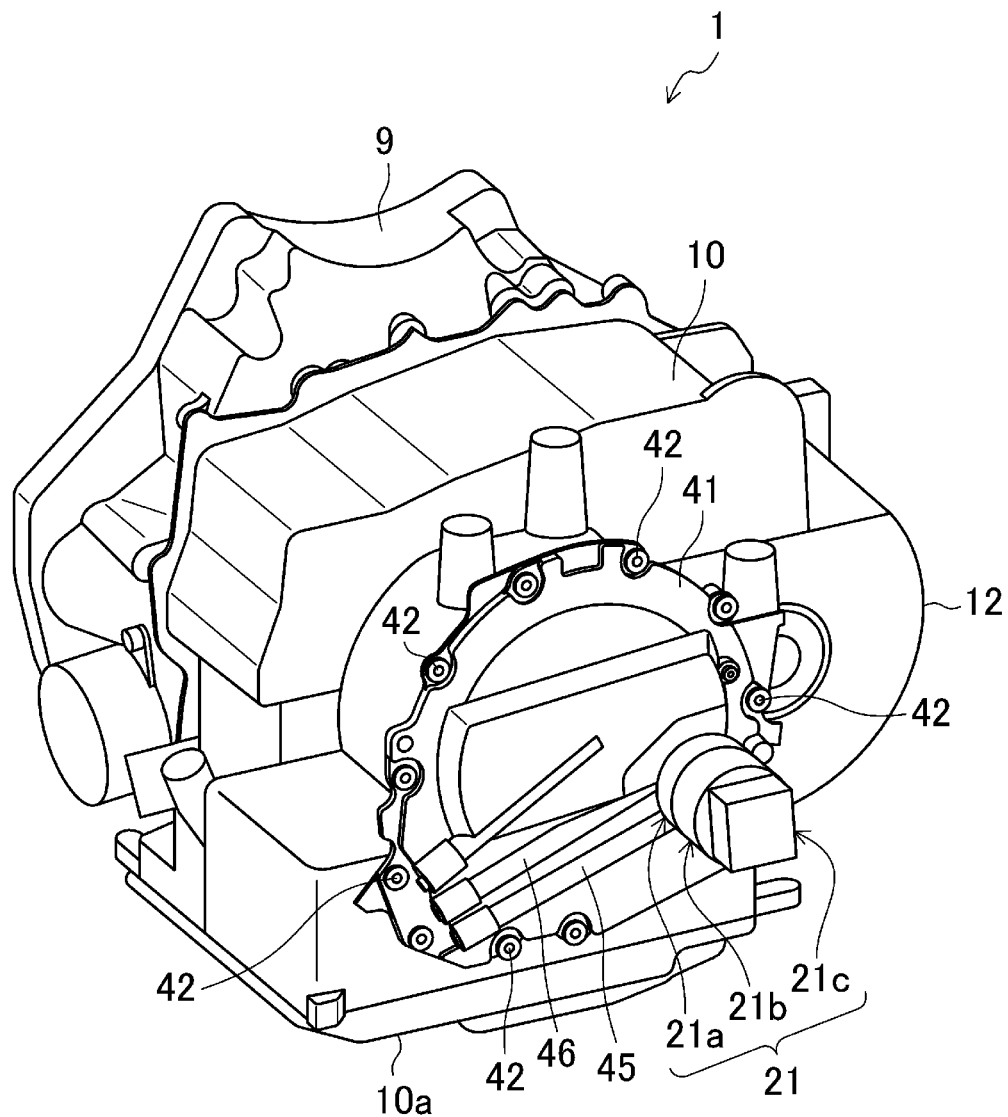
FIG. 11 is a perspective view of another modification of the electric pump unit, which corresponds to FIG. 2.

While the electric pump unit 21 of the above-described embodiment is the axial piston type, it may be comprised of any other type of pump unit. In case the electric pump unit 21 is a gear pump unit, as shown in FIG. 11, it is preferable that the pump portion 21a, the motor portion 21b, and the driver circuit portion 21c be disposed in the vehicle width direction (the pump axis extends in the vehicle width direction). In particular, by arranging the pump portion 21a which is the closest to the end cover 41 at the end cover 41, the projection amount of the electric pump unit 21 from a left-side face of the end cover 41 can be made as small as possible. Further, any other oil-pressure output device which can output an oil pressure even if the engine 2 stops (e.g., an accumulator to accumulate some oil pressure therein which is generated by the rotation of the engine 2 and to output the accumulated oil pressure during the engine stop) may be applied in place of the above-described electric pump unit 21. Moreover, the oil-pressure output device may be used for any purposes, and it may be unnecessary that it is the auxiliary pup to assist the oil pump 71 driven by the rotation of the engine 2.

Further, the electric pump unit 21 (oil-pressure output device) may be arranged at any position on the above-described outer wall face of the automatic transmission 1 as long as its arrangement position is out of the movable range of the steered drive wheel which is located on the opposite side to the engine 2. However, as described above, it may be preferable that the arrangement position of the electric pump unit 21 be located within the range of the specified distance or less in the vehicle longitudinal direction from the front drive shaft which is located on the opposite side to the engine 2 from viewpoints of the space efficiency.

The present should not be limited to the above-described embodiments, and any other modifications or improvements can be applied within the scope of a spirit of the present invention.

What is claimed is:

1. An automatic transmission drive apparatus for a vehicle, which is disposed laterally in an engine room of a vehicle front portion such that an axis thereof extends in a vehicle width direction, comprising:

an engine outputting a drive force;

an automatic transmission provided on one side of the engine in the vehicle width direction;

a differential device, to which the drive force of the engine is transmitted via the automatic transmission;

left and right drive shafts extending from the differential device in the vehicle width direction and connecting to left and right steered driving wheels, respectively; and an oil-pressure output device outputting an oil pressure, the oil-pressure output device being arranged on an outer wall face of the automatic transmission which is positioned on an opposite side to the engine, an arrangement position of the oil-pressure output device being out of a movable range of one of the steered driving wheels which is located on the opposite side to the engine within a space generated between said outer wall face and an inward end of said movable range.

2. The automatic transmission drive apparatus for a vehicle of claim 1, wherein the arrangement position of said oil-pressure output device is within a range of a specified distance or less in a vehicle longitudinal direction from one of said drive shafts which is located on the opposite side to the engine.

3. The automatic transmission drive apparatus for a vehicle of claim 1, wherein said differential device and one of said drive shafts which is located on the opposite side to the engine are positioned in back of said automatic transmission in a vehicle longitudinal direction, and said oil-pressure output device is arranged at a rear portion of said outer wall face of the automatic transmission.

4. The automatic transmission drive apparatus for a vehicle of claim 1, wherein said oil-pressure output device, when viewed from above, overlaps with a vehicle-body member which extends in a vehicle longitudinal direction on the opposite side to the engine.

5. The automatic transmission drive apparatus for a vehicle of claim 1, wherein said oil-pressure output device extends in a vertical direction.

6. The automatic transmission drive apparatus for a vehicle of claim 1, wherein said outer wall face of the automatic transmission is an end cover of a transmission case of said automatic transmission, and said oil-pressure output device is attached to the end cover.

7. The automatic transmission drive apparatus for a vehicle of claim 2, wherein said differential device and one of said drive shafts which is located on the opposite side to the engine are positioned in back of said automatic transmission in a vehicle longitudinal direction, and said oil-pressure output device is arranged at a rear portion of said outer wall face of the automatic transmission.

8. The automatic transmission drive apparatus for a vehicle of claim 7, wherein said oil-pressure output device, when viewed from above, overlaps with a vehicle-body member which extends in a vehicle longitudinal direction on the opposite side to the engine.

9. The automatic transmission drive apparatus for a vehicle of claim 8, wherein said oil-pressure output device extends in a vertical direction.

10. The automatic transmission drive apparatus for a vehicle of claim 9, wherein said outer wall face of the automatic transmission is an end cover of a transmission case of said automatic transmission, and said oil-pressure output device is attached to the end cover.

11. The automatic transmission drive apparatus for a vehicle of claim 1, wherein said oil-pressure output device, when viewed from the side, does not overlap with a vehicle-body member which extends in a vehicle longitudinal direction on the opposite side to the engine.

12. An automatic transmission drive apparatus for a vehicle, which is disposed laterally in an engine room of a vehicle front portion such that an axis thereof extends in a vehicle width direction, comprising:
an engine outputting a drive force;
an automatic transmission provided on one side of the engine in the vehicle width direction;
a differential device, to which the drive force of the engine is transmitted via the automatic transmission;
left and right drive shafts extending from the differential device in the vehicle width direction and connecting to left and right steered driving wheels, respectively; and
an oil-pressure output device outputting an oil pressure, the oil-pressure output device being arranged on an outer wall face of the automatic transmission which is positioned on an opposite side to the engine, an arrangement position of the oil-pressure output device on the outer wall face of the automatic transmission being located at a rear and lower portion of the outer wall face, in a side view, so as to be out of a movable range of one of the steered driving wheels which is located on the opposite side to the engine.

13. The automatic transmission drive apparatus for a vehicle of claim 12, wherein said outer wall face of the automatic transmission is formed by an end cover member which is attached to close an opening of a transmission case of the automatic transmission, and said oil-pressure output device is an electric pump unit which comprises a pump portion, a motor portion and a driver circuit portion, the electric pump unit being provided at said end cover member such that the pump portion, the motor portion and the driver circuit portion are piled up in a vertical direction of the vehicle, having a pump axis thereof extending in the vertical direction.

14. The automatic transmission drive apparatus for a vehicle of claim 12, wherein said oil-pressure output device is positioned below a side frame of the vehicle which extends in a vehicle longitudinal direction and above a side portion of a sub frame of the vehicle which suspends the steered driving wheels in the side view.

* * * * *